Oct. 5, 1926.                            1,601,825
D. M. GOODRICH
VEHICLE WHEEL RIM
Filed Oct. 26, 1923
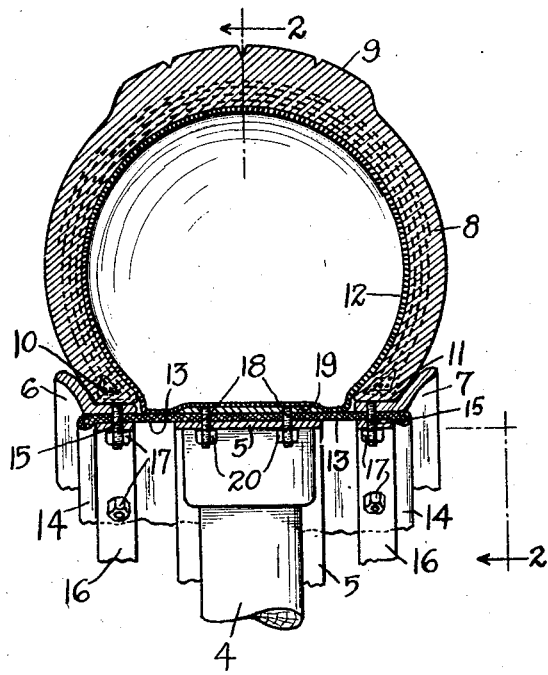
Fig. 1.
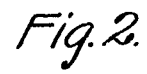
Fig. 2.
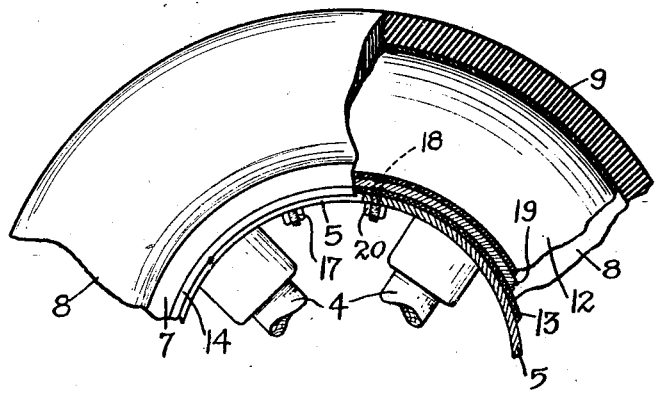
Fig. 3.
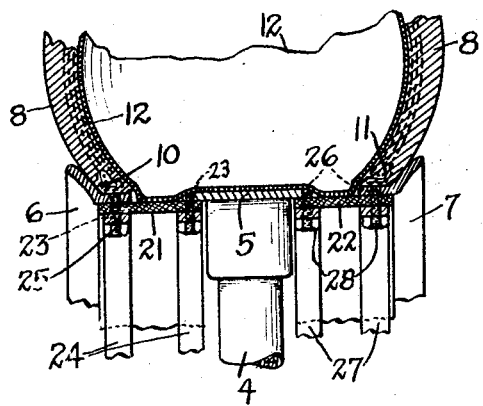
INVENTOR
DAVID M. GOODRICH
BY
ATTORNEY Patented Oct. 5, 1926.

1,601,825

UNITED STATES PATENT OFFICE.

DAVID M. GOODRICH, OF MOUNT KISCO, NEW YORK.

VEHICLE WHEEL RIM.

Application filed October 26, 1923. Serial No. 670,829.

My invention relates to improvements in rims for securing pneumatic or other forms of tires made of rubber or suitable elastic material on vehicle wheels which are especially designed for use on automobiles, though my rim improvements may also be successfully employed on all types of vehicle wheels having resilient tires attached to the wheel rims.

The chief object of my invention is, among other things, to provide an improved type or form of flexible wheel rim which shall be of a strong and durable construction, yet embody in itself independently yielding or flexible tire-supporting elements which shall be radially depressible relatively to the wheel so as to cushion the wheel as well as to avoid injury to the felly and springs when travelling over rough uneven roads. My present invention consists broadly in interposing yieldable or flexible connections between the tire-supporting rings spaced apart on either side of the wheel and the rim band or wheel felly proper, whereby each tire-supporting ring may have an independent movement relatively to the other and in a plane substantially parallel with the radii of the vehicle-wheel so as to eliminate road shocks and also to prolong the life of the tire mounted on such improved yieldable rim.

With these and other objects in view, my invention consists in the novel construction, arrangement and combination of parts hereinafter described and shown in some of its embodiments in the accompanying drawings, and then particularly pointed out in the appended claims.

Of the drawings, Fig. 1 is a cross-sectional view of a practical embodiment of my improved wheel rim showing a tire suitably mounted thereon;

Fig. 2 is a side elevation, partly in section, taken on the line 2—2 of Fig. 1 looking in the direction of the arrows; and Fig. 3 is a fragmentary cross-sectional view of a modified form which the invention may assume.

Similar numerals refer to similar parts throughout the several figures of the drawings.

Referring to Fig. 1, the spokes 4 of the vehicle wheel carry the iron or steel hoop-band 5 forming the felly ring of the wheel. Two tire-supoprting rings 6 and 7 of like diameter are disposed on either side of the hoop-band 5 and are spaced therefrom to hold in position the arched tire casing 8 constructed with the tread surface 9. Such casing 8 comprises any suitable fabric or cord structure built according to any desired method. The tire casing 8 is also constructed with the annular beads 10 and 11 which seat in the rings 6 and 7 respectively, whereby the peripheral edges of the tire casing 8 may be held in the usual arched form when inflated. The casing 8 also contains the usual inner inflatable tube 12. Interposed between the two rings 6 and 7 is a flexible or yielding structure, such as the flexible or yielding structure, such as the circular belt or band 13 made of rubberized fabric, cord, leather or other suitable material. This band 13 may be preferably formed with the beading 14 and is rigidly attached to the rings 6 and 7 by suitable screw bolts securely threaded in the rings 6 and 7 with their inner ends also threaded and passing through the band 13 and the binding rings 16 on which inner ends the clamping nuts 17 are threaded as shown. The central portion of the band 13 is attached to the hoop-band 5 in a similar manner by screw bolts 18 securely threaded in the circular plate 19 with the inner ends of these bolts 18 threaded and passing through holes in the band 13 and hoop-band 5, on which inner threaded ends the clamping nuts 20 are secured as shown in Figs. 1 and 2 clamping nuts 20. Any other suitable means for securing the yielding band 13 to the two tire-supporting rings 6 and 7 and hoop-band 5 may be employed, the construction shown in Fig. 1 being one practical form of uniting the component parts of the rim as shown in Figs. 1 and 2.

In the modified form shown in Fig. 3, two separate yielding circular belts or bands 21 and 22 are employed made of the same flexible structure as the band 13 used in the form shown in Figs. 1 and 2. The band 21 is attached to the tire-supporting ring 6 and the hoop-band 5 by the screw bolts 23 securely threaded in the hoop-band 5 and ring 6 with their inner ends also threaded and passing through the band 21 and binding rings 24 on which inner threaded ends the clamping nuts 25 are secured, while the band 22 is likewise attached to the tire-supporting ring 7 and hoop-band 5 by the screw bolts 26 securely threaded in the hoop-band 5 and ring 7 with their inner ends also threaded and passing through the band 22 and binding rings 27 on which inner threaded ends the clamping nuts 28 are secured as shown in Fig. 3.

In both forms of my improved tire rim shown, the tire-supporting rings 6 and 7 are held in spaced-apart relationship to the hoop-band 5 and in substantial parallelism therewith by a yielding or flexible structure such as the belt or band 13, or by the separate bands 21 and 22, whereby the rings 6 and 7 may move independently of each other in planes which are substantially parallel to each other, and also substantially parallel to the plane of the wheel radii. When the wheel is in motion that portion of the rings 6 and 7 below the hub will be yieldingly forced upwardly in varying degrees with a corresponding movement being imparted to that portion of the rings 6 and 7 which is opposite and above the hub, thus causing the relative positions of the two rings 6 and 7 to constantly change not only with respect to the hoop-band 5 but also with respect to each other according to the character of the road surface, so as to lessen road shocks when traveling over rough uneven roads. Likewise my improved rim with its circumferential yielding connections between the hoop-band 5 forming the felly ring of the wheel and tire-supporting rings 6 and 7 will in itself have a certain amount of flexibility or elasticity throughout its periphery, since the two rings 6 and 7 are free to yield to a certain extent under pressure or from a blow. Thus the rim, while sufficiently rigid, will also possess novel yielding qualities which aid it in resisting road shocks and stresses likely to occur when in use, besides adding materially to the easy-riding qualities of the vehicle.

It will be understood that various changes may be resorted to in the structural elements embodied in my improved vehicle wheel rim without departing from the principle and scope of my invention as set forth in the claims.

I claim as my invention:—

1. A vehicle wheel rim comprising a pair of flanged rings arranged on either side of the felly, an arched tire casing mounted on said rings, and means for yieldingly holding each ring to the felly and spaced therefrom in mutually parallel position to permit independent movements relatively to each other and the felly.

2. A vehicle wheel rim comprising a pair of flanged rings of substantially the same diameter as the felly and arranged on either side of the felly, an arched tire casing mounted on said rings, and means for yieldingly holding each ring throughout its circumference to the felly and spaced therefrom in mutually parallel position to permit independent movements relatively to each other and the felly.

3. A vehicle wheel rim comprising a tire-engaging element arranged on each side of the felly and independently movable relatively to each other and the felly, a flexible arched tire casing mounted thereon and separate means for yieldingly holding each element to the felly, while permitting independent movements relatively to said felly.

DAVID M. GOODRICH.